(12) United States Patent
Rizzo

(10) Patent No.: US 8,164,762 B2
(45) Date of Patent: Apr. 24, 2012

(54) INTELLIGENT TEXT DRIVEN DOCUMENT SIZING

(75) Inventor: Ronney John Rizzo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1050 days.

(21) Appl. No.: 11/517,058

(22) Filed: Sep. 7, 2006

(65) Prior Publication Data

US 2008/0062437 A1    Mar. 13, 2008

(51) Int. Cl.
*G06F 15/02* (2006.01)
*G06K 15/02* (2006.01)

(52) U.S. Cl. ......... 358/1.11; 358/1.2
(58) Field of Classification Search .......... 358/1.11, 358/1.2
See application file for complete search history.

(56) References Cited

U.S. PATENT DOCUMENTS

| | | | |
|---|---|---|---|
| 4,887,301 A | 12/1989 | Hodgens et al. ............ 382/9 |
| 5,237,379 A | 8/1993 | Sklut et al. ............ 355/311 |
| 5,253,307 A | 10/1993 | Wayner et al. ............ 382/22 |
| 5,513,277 A | 4/1996 | Huttenlocher ............ 382/171 |
| 5,668,891 A | 9/1997 | Fan et al. ............ 382/168 |
| 5,689,585 A | 11/1997 | Bloomberg et al. ............ 382/229 |
| 5,796,877 A * | 8/1998 | Gusmano ............ 382/298 |
| 5,883,974 A | 3/1999 | Fan et al. ............ 382/203 |
| 5,953,453 A | 9/1999 | Fan et al. ............ 382/200 |
| 6,741,745 B2 | 5/2004 | Dance et al. ............ 382/229 |
| 6,956,979 B2 | 10/2005 | Janakiraman et al. ............ 382/301 |
| 7,280,782 B2 * | 10/2007 | Maeda et al. ............ 399/81 |
| 7,509,067 B2 * | 3/2009 | Katahira ............ 399/75 |
| 2001/0038462 A1 * | 11/2001 | Teeuwen et al. ............ 358/1.15 |
| 2002/0036788 A1 * | 3/2002 | Hino ............ 358/1.11 |
| 2002/0122197 A1 * | 9/2002 | Abir ............ 358/1.11 |
| 2003/0174354 A1 * | 9/2003 | Oteki ............ 358/1.13 |
| 2004/0212853 A1 * | 10/2004 | Kelly et al. ............ 358/488 |
| 2005/0237546 A1 | 10/2005 | Rahman et al. ............ 358/1.9 |
| 2006/0028696 A1 * | 2/2006 | Michiie et al. ............ 358/474 |

* cited by examiner

*Primary Examiner* — Benny Q Tieu
*Assistant Examiner* — Eric A Rust
(74) *Attorney, Agent, or Firm* — Luis M. Ortiz; Kermit D. Lopez; Melissa Asfahani

(57) ABSTRACT

A method for automatically magnifying a copy job to result in a copied text that is not smaller than a user specified minimum size. An original document is automatically scanned and an analysis performed to determine, the smallest text size within the original document. A magnification for rendering the document can then be set. Media size can then be selected appropriately, and an image magnification ratio and output document size selections optimized to create a text size in the resulting rendering document which are as close as possible to a user's minimum text size selection when the user selected minimum text size cannot be achieved.

20 Claims, 4 Drawing Sheets

INTELLIGENT TEXT DRIVEN DOCUMENT SIZING

TECHNICAL FIELD

Embodiments are generally related to data-processing methods, systems and devices. Embodiments are also related to image processing and rendering devices, such as digital data copiers. Embodiments are additionally related to intelligent text driven document sizing.

BACKGROUND OF THE INVENTION

Many processes and devices have been used for data-processing. Documents may contain text of various sizes. Individuals wishing to use such documents in a hardcopy form, may encounter limitations with respect to the smallest text size they can comfortably read depending on the quality of their eyesight. Thus, a user may wish to improve the readability of documents used in hardcopy form and may 'right-size' such documents by engaging in a trial and error approach to copying such documents with various magnifications until the smallest text sizes contained in the document are at a preferred size in the reproduced document. Right-sizing may also include reducing the size of the document containing text and the paper size it is printed on, and to conserve paper, as long as a minimum text size is maintained for readability. This too is typically accomplished through trial and error. Operator productivity declines linearly with increased numbers of documents, each having different document and text sizes (e.g., a mixed stack of marriage licenses, birth certificates, ID cards).

Prior art digital document copiers have attempted to "intelligently" select one or more document reproduction factors when other reproduction factors are provided. Relevant factors in such rendering devices include the original document size, magnification ratios, and output document sizes. For example, given an original document size (automatically determined by digital document system) and magnification ratio (manually selected by the user), the digital document system automatically selects an output document (e.g., paper) size. The problem with this approach is that the rendering device does not automatically optimize document reproduction factors to achieve a specified minimum text size in the rendered document. Such a problem has not been directly addressed by prior art devices and techniques.

Another is that such devices and techniques require the manual selection of text areas within a document to magnify to a desired text size. This approach is not scalable as the number of original documents and the number of text areas within these documents increase. It therefore believed that an improved image processing technique is required to overcome these disadvantages.

Some rendering features may permit a user to change the typeface or font size in an original document and scan a user-selected area of the original document, in order to convert the manually selected characters to a user selected font, and print the document. One of the problems with this approach, however, is that it is necessary for the user to manually identify every single instance of text that should be considered in the calculation in order to achieve a targeted minimum text size in the reproduced document. It is believed that these problems and others can be overcome and addressed by implementing the methods, systems and devices disclosed and described in further detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved system for data-processing.

It is another aspect of the present invention to provide for improved image processing in digital data copiers.

It is a further aspect of the present invention to provide for intelligent text driven document sizing in digital data copiers.

The aforementioned aspects and other objectives and advantages can now be achieved as described herein. A method, system and program product for text driven document sizing in a rendering device is disclosed. A minimum text size of text contained in an original document can be automatically detected. Next, a particular minimum text size can be specified based on a user input, wherein the particular minimum text size is achievable in a rendered document based on the original document. The detected minimum text size and the particular minimum text size input by the user can be utilized in order to automatically determine an image magnification ratio and one or more output document sizes required to achieve the particular minimum text size in the rendered document via the rendering device. The text size ultimately achieved in the rendered document is as close as possible to the particular minimum text size if the particular minimum text size specified by the user is unachievable. The rendering device can be, for example, a digital data copier.

In a simplest embodiment, a user may possess a single sided original hardcopy document. Such a document may contain texts of various sizes. The smallest text size on the document may be smaller than the user can comfortably read (e.g., font 8 or equivalent). The original document size could range from very small (e.g., business card, drivers license, or receipt) to typical (e.g., report, bill, dinner menu etc.). The original document size may be one or more standard sizes below the largest paper size upon which the rendering device is capable of reproducing images on. This is required so that an enlarged original image can fit on the output document size stock. This user may have additional constraints. For example, the user may desire to enlarge the document to achieve a minimum text height, but only to the extent where the maximum allowed reproduced document size is 8.5×14 inches.

The rendering device can be configured to determine whether or not the rendering device is loaded with paper stock large enough to accommodate the magnified image necessary to achieve the desired minimum text size in the reproduced document. In this case, the device will attempt to achieve a text height that is as close as possible to the desired minimum text height. Different image magnification ratios may be required on a two sized original document to achieve the users specified minimum text size in each reproduced image in the output document. Such a scenario can be addressed by permitting the rendering device to pre-scan the original two sided document and individually determine the minimum output document size needed to accommodate the side 1 and side 2 images. The actual rendered (e.g., reproduced) output document size for the two sided document would be the larger of the two (side 1 and side 2) document sizes.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be integrated into a software architecture that aligns separate software technologies to produce a desired effect. Components from several software systems, along with a special highlight region extraction module, can enable an automated extraction as described in greater detail herein.

Note that the embodiments can be implemented in the context of a host operating system and one or more software modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

The embodiments disclosed herein may be executed in a variety of systems, including a variety of computers running under a number of different operating systems. The computer may be, for example, an embedded computer, a personal computer, a network computer, a mid-range computer or a mainframe computer. In the preferred embodiment, the computer is utilized as a control point of network processor services architecture within a local-area network (LAN) or a wide-area network (WAN).

Figure 1:
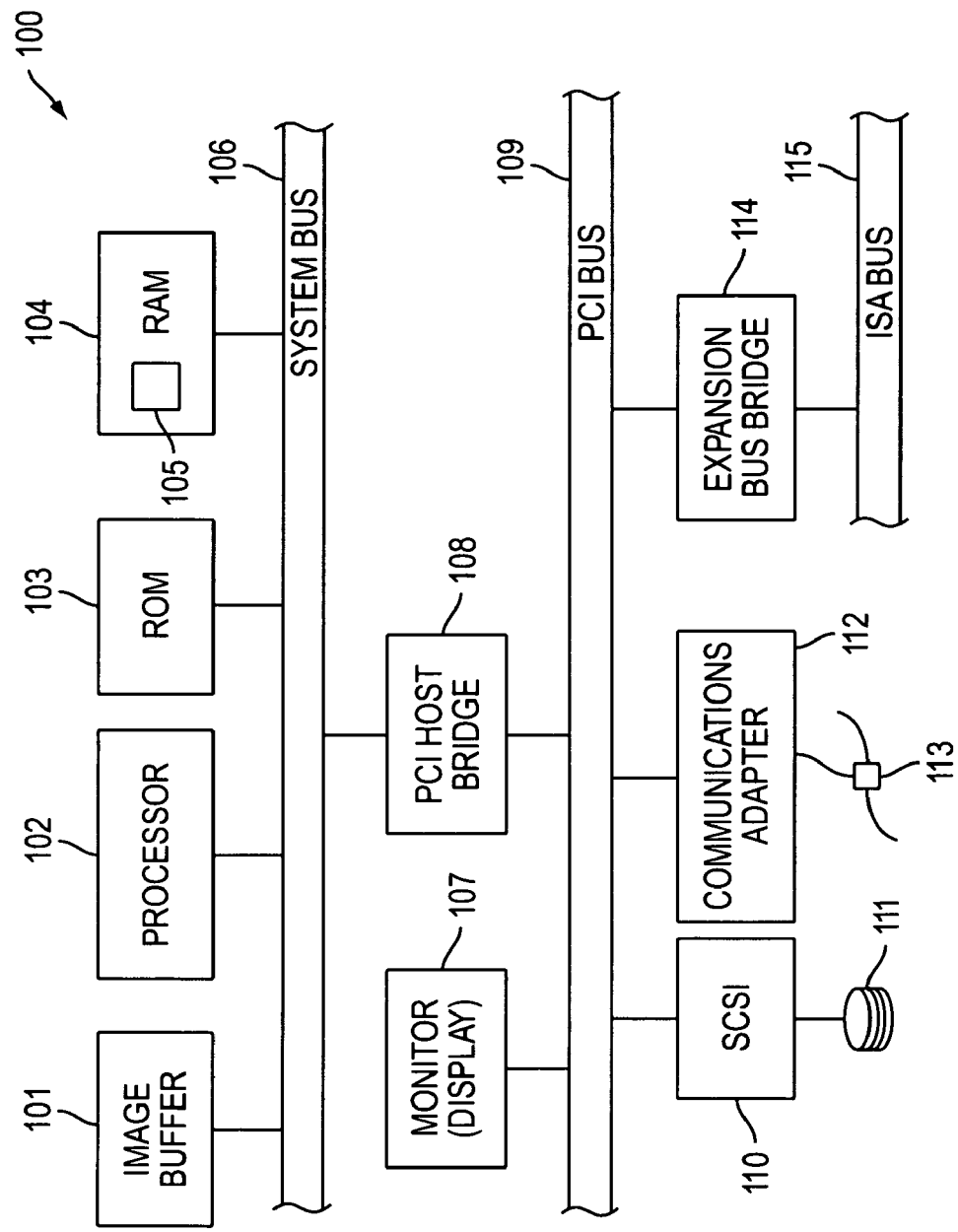
FIG. 1 illustrates a block diagram of a representative image-processing apparatus in which a preferred embodiment can be implemented.

Referring now to the drawings and in particular to FIG. 1, there is depicted a block diagram of a representative data-processing apparatus 100 (e.g., a computer and/or digital data copier) in which a preferred embodiment can be implemented. As shown, processor (CPU) 102, Read-Only memory (ROM) 103, and Random-Access Memory (RAM) 104 are connected to system bus 106 of data-processing apparatus 100. An image buffer 101 can also be included. Memory 120 can be implemented as a ROM, RAM, a combination thereof, or simply a general memory unit. Data-processing apparatus 100 can include CPU 102, ROM 103, and RAM 104, which are also coupled to Peripheral Component Interconnect (PCI) local bus 109 of data-processing apparatus 100 through PCI host-bridge 108. PCI Host Bridge 108 can provide a low latency path through which processor 102 may directly access PCI devices mapped anywhere within bus memory and/or input/output (I/O) address spaces. PCI Host Bridge 108 also provides a high bandwidth path for allowing PCI devices to directly access RAM 104.

Also attached to PCI local bus 109 are communications adapter 112, small computer system interface (SCSI) 110, and expansion bus-bridge 114, communications adapter 112 is utilized for connecting data-processing apparatus 100 to a network 113. SCSI 110 is utilized to control high-speed SCSI disk drive 111. Expansion bus-bridge 114, such as a PCI-to-ISA bus bridge, may be utilized for coupling ISA bus 115 to PCI local bus 109. In alternate embodiments, additional peripheral components may be added or existing components can be connected to the system bus.

Data-processing apparatus 100 also preferably includes an interface such as a graphical user interface (GUI) and an operating system (OS) that reside within machine readable media to direct the operation of data-processing apparatus 100. In the preferred embodiment, OS (and GUI) contains additional functional components, which permit network-processing components to be independent of the OS and/or platform. Any suitable machine-readable media may retain the GUI and OS, such as RAM 104, ROM 105, SCSI disk drive 111, and other disk and/or tape drive (e.g., magnetic diskette, magnetic tape, CD-ROM, optical disk, or other suitable storage media). Any suitable GUI and OS may direct CPU 102. Further, data-processing apparatus 100 preferably includes at least one network processor services architecture software utility (e.g., program product) that resides within machine-readable media, for example a custom defined service utility or module 105 within RAM 104. The software utility or module can contain instructions (or code) that when executed on CPU 102 interact with the OS. Utility or module 105 can be, for example, a program product as described herein. Utility or module 105 can be provided as, for example, a software module such as described above and in further detail herein. Apparatus 100 can be provided in the context of one or more processor readable storage devices having processor readable code on the processor readable storage devices, the processor readable code for programming one or more processor to perform a method for text driven document sizing in a rendering device as indicated, for example, herein with respect to the methodology FIGS. 2A-2B.

In a simplest embodiment, a user may possess a single sided original hardcopy document. Such a document can contain text of various sizes. The smallest text size on the document is smaller than the user can comfortably read (e.g., font 8 or equivalent). The original document size could range from very small (e.g., business card, drivers license, or receipt) to typical (e.g., report, bill, dinner menu etc.). The original document size is ideally one or more standard sizes below the largest paper size the device is capable of reproducing images on. This is required so that an enlarged original image can fit on the output document size stock. This user may have additional constraints. For example, the user may desire to enlarge the document to achieve a minimum text height, but only to the extent where the maximum allowed reproduced document size is 8.5×14 inches.

It is possible that the device will determine that it is not loaded with paper stock large enough to accommodate the magnified image necessary to achieve the desired minimum text size in the reproduced document. In this case, the device will attempt to achieve a text height that is as close as possible to the desired minimum text height. Embodiments are described in greater detail herein.

Figure 2A:
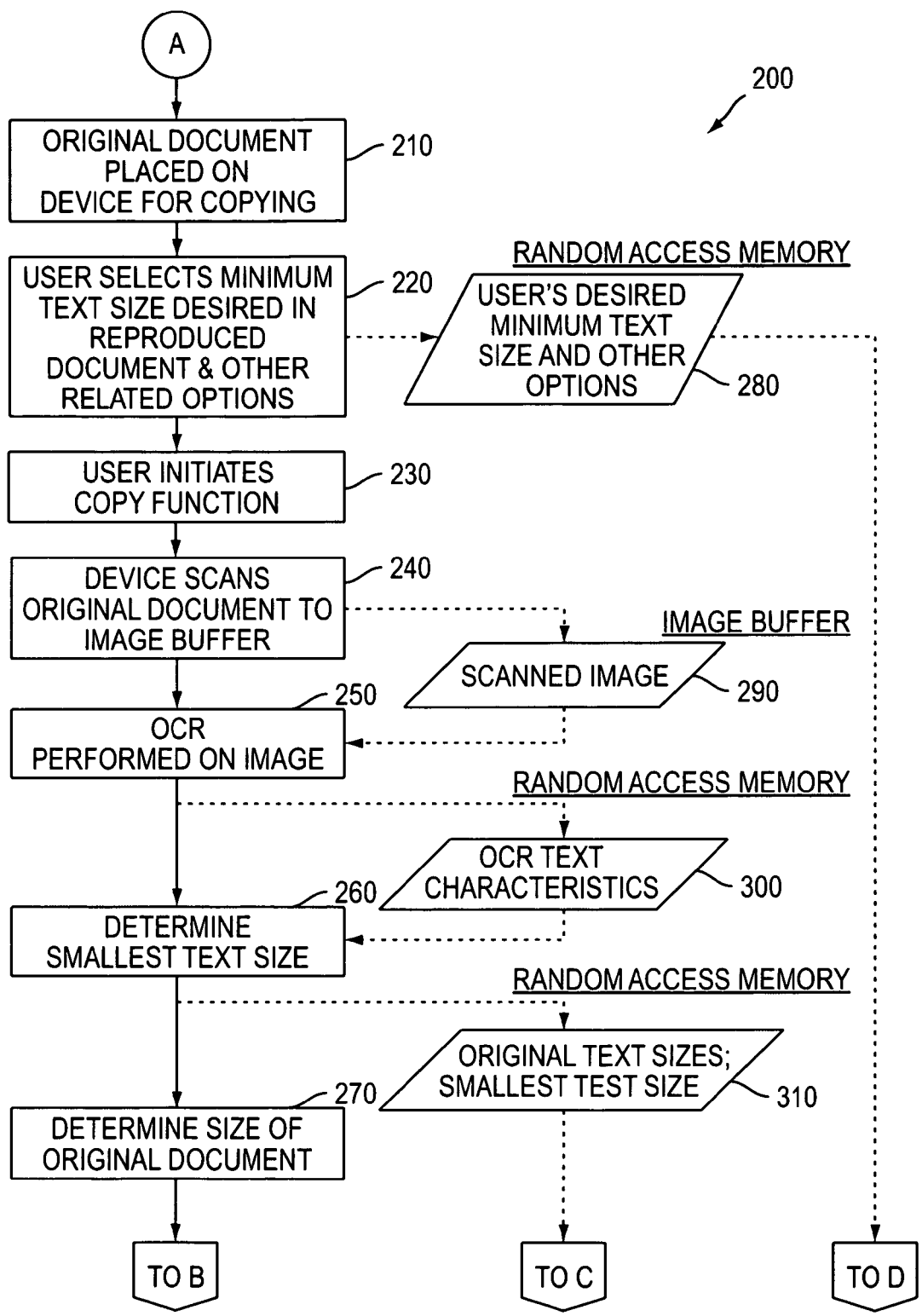
FIG. 2A illustrates a high level flow chart of an image processing method for intelligent text driven document sizing, which can be implemented in accordance with a preferred embodiment.
Figure 2B:
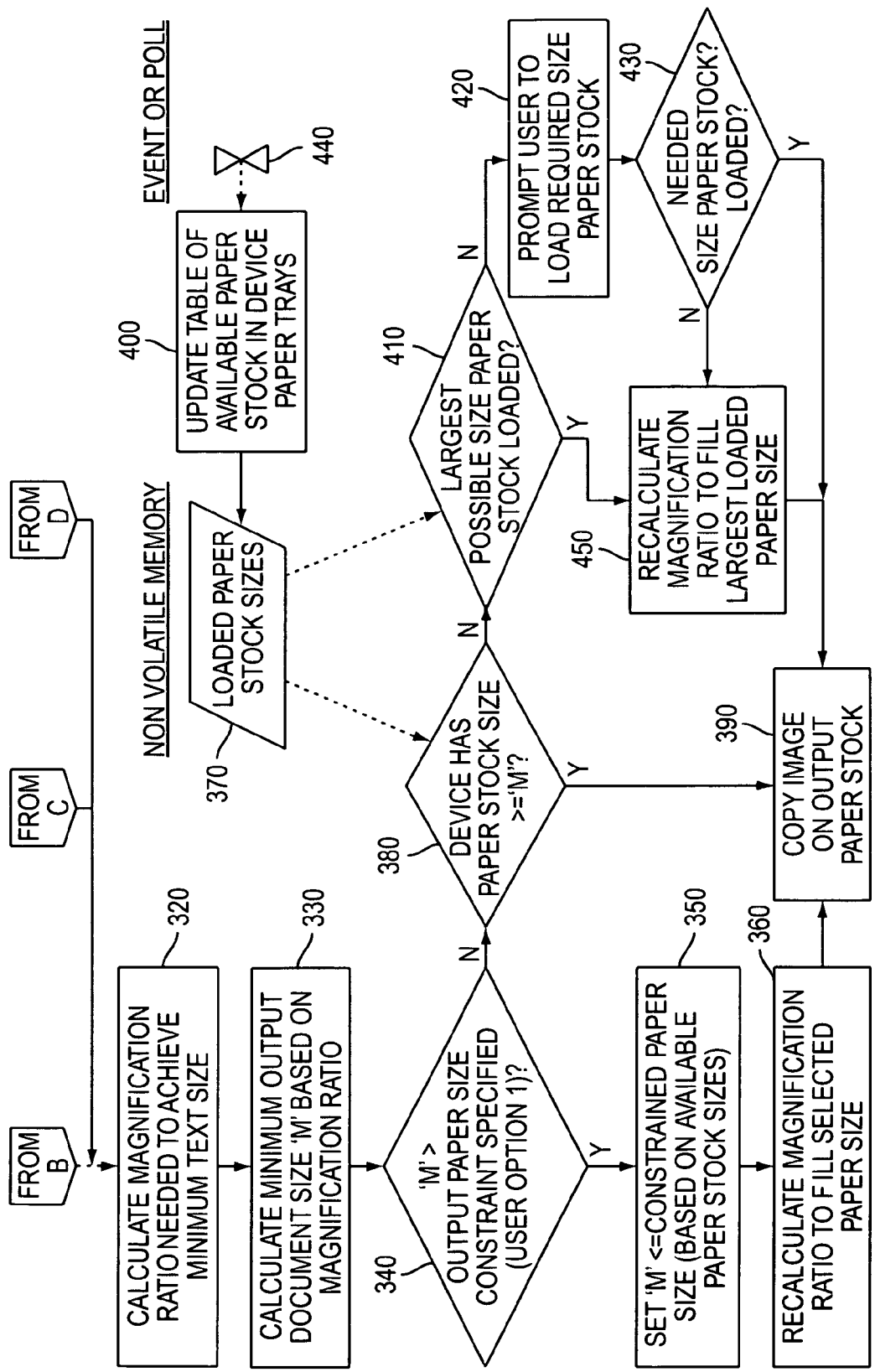
FIG. 2B illustrates a continuation of the high level flow chart depicted in FIG. 2A, in accordance with a preferred embodiment.

FIGS. 2A-2B illustrate a high level flowchart of operations depicting a method 200 for reproducing a hard copy of an original document in a size within a user specified range in the context of a digital data copier or similar device in accordance with a preferred embodiment. One example of a digital data copier, which can be adapted for use in accordance with an embodiment is the digital data copier 301, which is illustrated herein and described in greater detail below. Note that the flow chart depicted in FIG. 2B is a continuation of the flow chart illustrated in FIG. 2A.

Note that the method depicting in FIGS. 2A-2B can be implemented in the context of "modules". In the computer programming arts, a "module" can be implemented as a collection of routines and data structures that performs particular tasks or implements a particular abstract data type. Modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media. One or modules can be therefore be implemented to process the instructions provided via the various operational blocks depicted in FIGS. 2A-2B. An example of such a module is module 105 depicted in FIG. 1.

As indicated at block 210, the user places an original document on the digital data copier for reproduction and rendering. Variations on the operation depicted at block 210 include the user directly placing the original on a device platen glass associated with the digital data copier, or the user placing the original document in an automatic or semi-automatic document handler such as, for example, the document handling unit 306 depicted in FIG. 3. Thereafter, the user can select a minimum text size desired in the reproduced document as depicted in block 220. The data can be then stored with in memory unit associated with the digital data copier, as indicated at block 280. Such a memory unit can be, for example, ROM 103 and/or RAM 104 depicted in FIG. 1 and/or associated with the digital data copier 301 illustrated in FIG. 3.

If the output document (e.g., paper) size is constrained to a user specified range of paper sizes, the digital data copier 301 can automatically select the paper size. If the digital data copier 300 determines that it cannot achieve the selected minimum text size in the reproduced document (e.g., because the digital data copier 301 is not loaded with sufficiently larger size paper stock), the digital data copier 301 alternatively optimizes image magnification ratio and output document size selections to achieve a text size in the reproduced document that is as close as possible (i.e., avoids image loss) to the minimum text size selected by the user. These options may be configured as device defaults or user-selections. The selection may be configured via a device user interface such as, for example, the user interface (UI) 302 of the digital data copier 300 depicted in FIG. 3.

The user can select via UI 302, for example, a UI menu item that causes the digital data copier 300 to prompt the user to enter a minimum font size or text height via the device key pad. Alternatively, a dedicated UI designed for devices having half or full panel flat screen touch panels can be provided via digital data copier 300 to accommodate all pertinent user parameter selections needed in support of the embodiments. Thereafter, as depicted at block 230, the user can initiate a reproduction operation using, for example, a "start print button" of the digital data copier 300. A digital image of the original document is generally captured using digital reproduction and rendering techniques as depicted at block 240. The captured data can be stored in a device image buffer indicated at block 290. Such a device image buffer can be, for example, associated with the digital data copier 300.

Next as depicted at block 250, an optical character recognition (OCR) operation can be performed on the scanned image. Thereafter, the digital data copier 300 can analyze the stored image, as depicted at block 290, in order to determine text sizes, and then store the detected text sizes into a device memory as indicated at block 300. Next, the digital data copier 300 can determine the smallest text size contained in the document as depicted at block 260. Each text size detected is already recorded in the temporary device memory (i.e., see block 300). After all text sizes on the document are determined, the digital data copier 300 can record the smallest text size and stored this information, as indicated at block 310. The digital data copier 300 determines the size of the original document as indicated at block 270. A typical method for sensing the size of a document on a digital copy device is to employ the use of platen sensor arrays.

Thereafter, the digital data copier 300 can calculate the image magnification ratio needed to transform the smallest text size contained in the original document to the minimum text size desired in the reproduced document, as depicted at block 320. The magnification ratio can be obtained by using the equation Magnification ratio R=[a/b], wherein:

a=minimum text size to be achieved in the reproduced document in units of measure (e.g., inches), b=smallest text size detected in the original document.

Next, the digital data copier 300 can determine the minimum size of the output document based on the magnification ratio, image size, and the original document size as indicated at block 330 and may be further constrained through the optional user selections 1 and 2 as described at block 220. As depicted at block 340, if the user placed a limitation on the maximum output document size, the digital data copier 300 can automatically select the output document size. Thereafter, as illustrated at block 350, the digital data copier 300 can set the targeted output document size to the largest available paper stock size that is loaded in the device and that is within the size limitations specified by the user. Continuing with this operation, as indicated at block 360, the digital data copier 300 can recalculate the magnification ratio to fill the selected output document size.

Next, as depicted at block 390, the digital data copier 300 can copy the image to the selected output paper stock. The sizes of paper stock loaded in the digital data copier 300 can be determined by reading paper tray sensors, searching for paper sizes in a look up table, and recording loaded paper sizes in a device non-volatile memory. If, as depicted at block 340, the digital data copier 300 determines that the user did not place a limitation on the maximum output document size, then as described at block 380, the digital data copier 300 can determine whether it is loaded with the output paper stock required to host the image containing the optimized text size. If, as indicated at block 380, the device is loaded with output paper stock required to host the image, then as illustrated at block 390, the image can be copied to the required output document size resulting in the minimum user specified test size being reproduced in the output document. If, as depicted at block 380, the device is not loaded with output paper stock required to host the image, then as described at block 410, the digital data copier 300 can determine if it is loaded with the largest possible paper stock size the device can handle.

If the digital data copier 300 is already loaded with the largest possible output document size, then as illustrated at block 450, the image magnification ratio can be automatically adjusted to fit on the largest output document size. Thereafter, as described at block 390, the image can be copied to the largest size output paper stock. In this case, the desired text size may not be achieved because the device does not reproduce documents on large enough paper stock resulting in a reproduced text size that is 'as close as possible' to the desired text size. If however, as indicated at block 380, the digital data copier 300 determines that it is not loaded with the largest possible paper stock size, then as depicted at block 420, the digital data copier 300 can prompt the user to load the largest possible paper stock size.

As depicted at block 430, if the loaded paper stock is large enough to host the magnified image, then the operation indicated at block 390 is processed, where the image is copied to the output paper stock size required to achieve the minimum desired text size. As illustrated at block 430, if the loaded paper stock is not large enough to host the magnified image, then as indicated at block 450, the image magnification ratio is adjusted to fit on the largest output document size. Thereafter, the operation depicted at block 390 can be processed, wherein the image is copied to the largest size output paper stock. On an event or polling basis (i.e., see block 440), the digital data copier 300 can determine the sizes of available output paper stock loaded in the digital data copier 300 (i.e., see block 400) and stores the sizes in a memory as depicted at block 370.

If the user has a two sided original hardcopy document, for example, then each side of the document may contain text of various sizes that can range from very small (e.g., business card, drivers license, or receipt) to typical (e.g., report, bill, dinner menu etc.). The original document size can also be one or more standard sizes below the largest paper size the device is capable of reproducing images on. The methodology described herein can then handle the case where different image magnification ratios may be required on a two sized original document to achieve the user's specified minimum text size in each reproduced image in the output document. A method for addressing this scenario involves pre-scanning the original two sided document and individually determining the minimum output document size needed to accommodate the side 1 and side 2 images following the methods described above. The actual reproduced output document size for the two sided document would be the larger of the two (side 1 and side 2) document sizes.

Embodiments can enable increased competitiveness by directly addressing the need of target populations to productively create hardcopy documents that contain a minimum user specified text size and assists in reducing paper waste from failed attempts to achieve a minimum specified text size manually through trial and error. Embodiments also enable increased page volume resulting from users taking advantage of a feature that directly addresses their need to effectively create readable hard copy documents while also serving users who have visual impairments.

Figure 3:
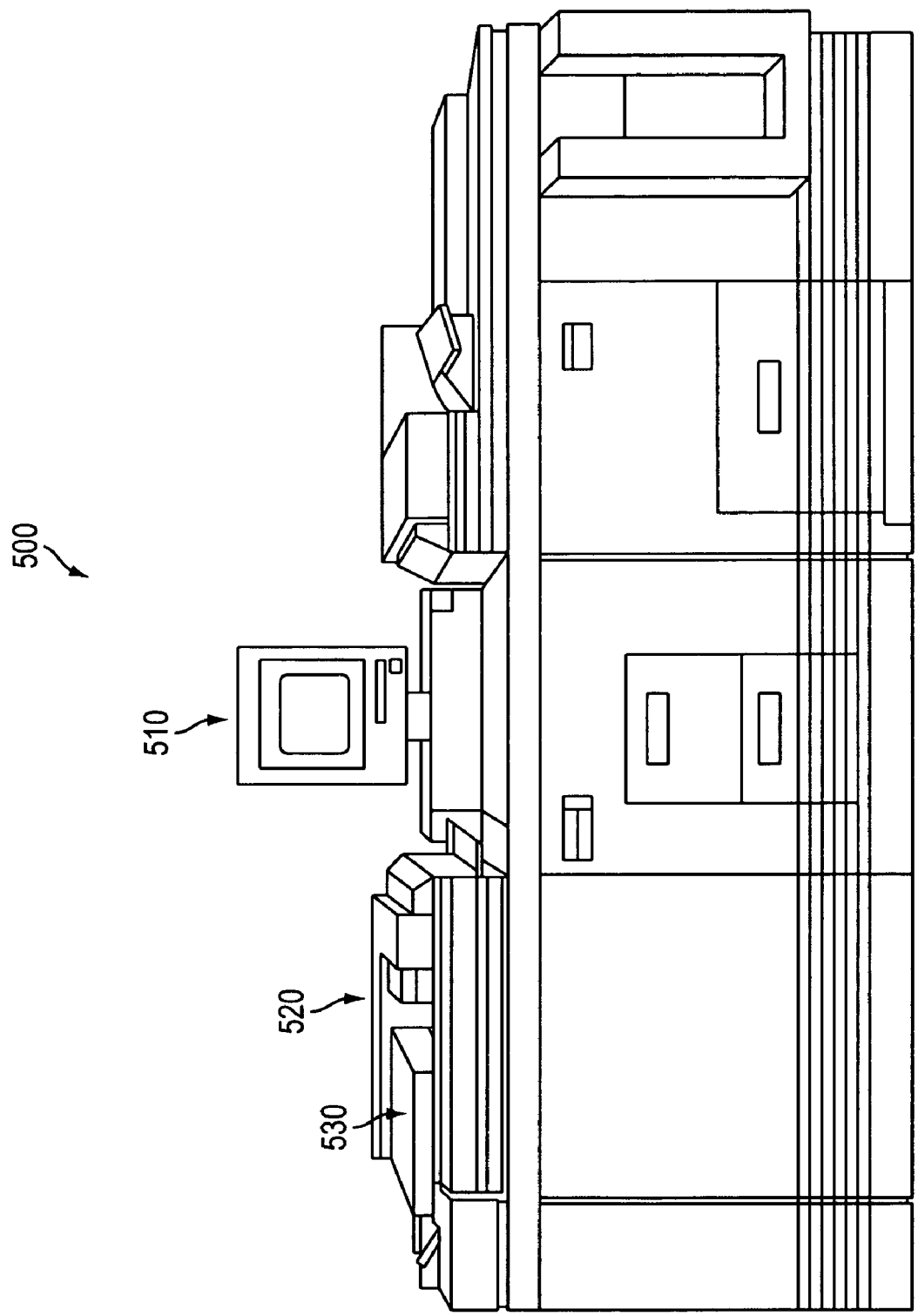
FIG. 3 illustrates an example of a digital data copier that can be adapted for use in accordance with a preferred embodiment.

FIG. 3 illustrates an example of a digital data copier 500 that can be adapted for use in accordance with a preferred embodiment. It can be appreciated that the digital data copier 500 depicted in FIG. 3 represents only one of many possible digital data copiers that can be utilized in accordance with a preferred or alternative embodiments. Digital data copier 500 is illustrated herein for exemplary purposes only and is not considered a limiting feature of the embodiments. Digital data copier 500 generally includes a digital scanning device 520 that digitally scans documents for eventual reproduction and printing. Digital data copier 500 also can include a user interface 510 that permits a user interact with and initiate digital data copying functions, such as, for example, digital photocopying and reproduction. Digital data copier 500 utilizes a document handling unit 530 that can sequentially feed documents from a stack of documents into the digital data copier 500 for digital copying, reproduction and rendering. Associated with the document handling unit is a device platen glass (not shown in FIG. 3) upon which a user can place a document for digital copying and rendering.

Digital data copier or rendering device 500 can, for example, be configured to include a plurality of output paper stock sizes via provided the rendering device in order to generate the rendered document, along with a software module for detecting output document sizes available to the rendering device in response to automatically detecting the minimum text size of text contained in the original document specifying the particular minimum text size based on the user input. The digital data copier 500 may also include a user interface associated with the rendering device, wherein the user interface collects at least one user reproduction preference.

The various functions of digital data copier 500 can be regulated by a controller which preferably comprises one or more programmable microprocessors. The controller provides a comparison count of the copy sheets, the number of documents being re-circulated, the number of copy sheets selected by the operator, time delays, jam corrections, etc. Programming and operating control over digital data copier 500 can be accomplished through a User Interface such as the user interface device 510. Operating and control information, job programming instructions, etc. can be stored in a suitable memory, which includes both ROM and RAM memory types. Conventional sheet path sensors or switches may be utilized to keep track of the position of the documents and the copy sheets. In addition, such a controller can regulate the various positions of the gates depending upon the mode of operation selected. Digital data copier 500 can communicate with the data-processing apparatus 100 depicted in FIG. 1 or can actually be integrated with the data-processing apparatus 100 in accordance with alternative embodiments.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for text driven document sizing for a plurality of differently-sized documents in a rendering device in a digital document system, comprising:

automatically detecting document sizes for said plurality of differently-sized documents by pre-scanning all sides of said plurality of differently-sized documents to determine said minimum output document sizes needed to accommodate all sides of said plurality of differently-sized documents, wherein reproduced output document sizes of said plurality of differently-sized documents are larger sides of said plurality of differently-sized documents;

automatically detecting minimum text sizes of text contained in said plurality of differently-sized documents;

recording said minimum text sizes of said text contained in said plurality of differently-sized documents;

detecting output document sizes available to said rendering device in response to automatically detecting said minimum text sizes of said text contained in said plurality of differently-sized documents and specifying a particular said minimum set text sizes;

utilizing said detected said minimum text sizes and said particular minimum set text sizes to automatically determine image magnification ratios and document sizes required to achieve said particular minimum text sizes in rendered documents via said rendering device, wherein text sizes achieved in said rendered documents are as close as possible to said particular minimum set text sizes if said particular minimum set text sizes specified are unachievable;

recalculating said magnification ratio to fill a largest loaded paper size; and automatically optimizing said plurality of differently-sized documents reproduction factors including at least one of original document size, image size, magnification ratios, and output document sizes.

2. The method of claim 1 wherein said rendering device comprises a digital data copier.

3. The method of claim 1 further comprising maintaining minimum text size readability by right-sizing said plurality of differently-sized documents containing text and reducing paper sizes of said plurality of differently-sized documents when printed, wherein right sizing comprises improving readability of said plurality of differently-sized documents size to maintain said minimum text size.

4. The method of claim 1 further comprising manually selecting text areas within said plurality of differently-sized documents for magnification to a desired text size on a scalable basis as a number of text areas and print jobs increase.

5. The method of claim 1 further comprising:
collecting at least one user reproduction preference utilizing a user interface associated with said rendering device.

6. The method of claim 1 further comprising:
providing a plurality of output paper stock sizes for use in said rendering device in order to generate said rendered document.

7. The method of claim 1 further comprising:
collecting said particular minimum set text sizes via a user interface associated with said rendering device.

8. The method of claim 1 further comprising:
specifying particular minimum set text sizes, wherein said particular minimum set text sizes are achievable in a rendered document based on text sizes of said plurality of differently-sized documents.

9. A system for text driven document sizing for a plurality of differently-sized documents in a rendering device, comprising:
a data-processing apparatus;
a module executed by said data-processing apparatus, said module and said data-processing apparatus being operable in combination with one another to:
automatically detect document sizes for said plurality of differently-sized documents by pre-scanning all sides of said plurality of differently-sized documents to determine said minimum output document sizes needed to accommodate all sides of said plurality of differently-sized documents, wherein reproduced output document sizes of said plurality of differently-sized documents are larger sides of said plurality of differently-sized documents;
automatically detect minimum text size of text contained in plurality of differently-sized documents;
record said minimum text sizes of said text contained in said plurality of differently-sized documents;
detect output document sizes available to said rendering device in response to automatically detecting said minimum text sizes of said text contained in said plurality of differently-sized documents and specifying a particular said minimum set text sizes;
utilize said detected said minimum text sizes and said particular minimum set text sizes to automatically determine image magnification ratios and document sizes required to achieve said particular minimum text sizes in rendered documents via said rendering device, wherein text sizes achieved in said rendered documents are as close as possible to said particular minimum set text sizes if said particular minimum set text sizes specified are unachievable;
recalculating said magnification ratio to fill a largest loaded paper size; and
automatically optimizing said plurality of differently-sized documents reproduction factors including at least one of original document size, image size, magnification ratios, and output document sizes.

10. The system of claim 9 wherein said rendering device comprises a digital data copier.

11. The system of claim 9 wherein said module and said data-processing apparatus are further operable in combination with one another to maintain minimum text size readability by right-sizing said plurality of differently-sized documents containing text and reduce paper size of said plurality of differently-sized documents when printed, wherein right sizing reduces said plurality of differently-sized documents size to maintain said minimum text sizes.

12. The system of claim 9 wherein said module and said data-processing apparatus are further operable in combination with one another to manually select text areas within said plurality of differently-sized documents for magnification to a desired text size on a scalable basis as a number of text areas and print jobs increase.

13. The system of claim 9 wherein said module and said data-processing apparatus are further operable in combination with one another to:
collect at least one user reproduction preference utilizing a user interface associated with said rendering device; and
specify particular minimum set text sizes, wherein said particular minimum set text sizes are achievable in a rendered document based on text sizes of said plurality of differently-sized documents.

14. A digital document system apparatus comprising one or more processor readable storage devices having processor readable code on said processor readable storage devices, said processor readable code for programming one or more processor to perform a method for text driven document sizing for a plurality of differently-sized documents in a rendering device, comprising:
automatically detecting document sizes for said plurality of differently-sized documents by pre-scanning all sides of said plurality of differently-sized documents to determine said minimum output document sizes needed to accommodate all sides of said plurality of differently-sized documents, wherein reproduced output document sizes of said plurality of differently-sized documents are larger sides of said plurality of differently-sized documents;
automatically detecting minimum text sizes of text contained in said plurality of differently-sized documents;
recording said minimum text sizes of said text contained in said plurality of differently-sized documents;
detecting output document sizes available to said rendering device in response to automatically detecting said minimum text sizes of said text contained in said plurality of differently-sized documents and specifying a particular said minimum set text sizes;

utilizing said detected said minimum text sizes and said particular minimum set text sizes to automatically determine image magnification ratios and document sizes required to achieve said particular minimum text sizes in rendered documents via said rendering device, wherein text sizes achieved in said rendered documents are as close as possible to said particular minimum set text sizes if said particular minimum set text sizes specified are unachievable;

recalculating said magnification ratio to fill a largest loaded paper size; and automatically optimizing said plurality of differently-sized documents reproduction factors including at least one of original document size, image size, magnification ratios, and output document sizes.

15. The apparatus of claim 14 wherein said rendering device comprises a digital data copier.

16. The apparatus of claim 14 further comprising a plurality of output paper stock sizes via provided said rendering device in order to generate said rendered document.

17. The apparatus of claim 14 further comprising a user interface associated with said rendering device, wherein said user interface collects said particular minimum set text sizes.

18. The apparatus of claim 14 further comprising maintaining minimum text size readability by right-sizing said plurality of differently-sized documents containing text and reduce paper size of said plurality of differently-sized documents when printed, wherein right sizing reduces said plurality of differently-sized documents size to maintain said minimum text sizes.

19. The apparatus of claim 14 further comprising manually selecting text areas within said plurality of differently-sized documents for magnification to a desired text size on a scalable basis as a number of text areas and print jobs increase.

20. The apparatus of claim 14 further comprising:

a user interface associated with said rendering device to collect at least one user reproduction preference; and particular minimum set text sizes based on a user input, wherein said particular minimum set text size is achievable in a rendered document based on text sizes of said plurality of differently-sized documents.

* * * * *